United States Patent
Takahashi et al.

(10) Patent No.: US 10,513,666 B2
(45) Date of Patent: Dec. 24, 2019

(54) REFRIGERATOR OIL AND WORKING FLUID COMPOSITION FOR REFRIGERATORS

(71) Applicant: JXTG Nippon Oil & Energy Corporation, Chiyoda-ku, Tokyo (JP)

(72) Inventors: Hitoshi Takahashi, Tokyo (JP); Souichirou Konno, Tokyo (JP); Kentaro Yamaguchi, Tokyo (JP); Yohei Shono, Tokyo (JP)

(73) Assignee: JXTG Nippon Oil & Energy Corporation, Tokyo (JP)

( * ) Notice: Subject to any disclaimer, the term of this patent is extended or adjusted under 35 U.S.C. 154(b) by 126 days.

(21) Appl. No.: 15/554,128

(22) PCT Filed: Feb. 29, 2016

(86) PCT No.: PCT/JP2016/056048
§ 371 (c)(1),
(2) Date: Aug. 28, 2017

(87) PCT Pub. No.: WO2016/140187
PCT Pub. Date: Sep. 9, 2016

(65) Prior Publication Data
US 2018/0037836 A1 Feb. 8, 2018

(30) Foreign Application Priority Data

Mar. 2, 2015 (JP) .................. 2015-040387

(51) Int. Cl.
*C09K 5/04* (2006.01)
*C10M 105/38* (2006.01)

(52) U.S. Cl.
CPC ........... *C10M 105/38* (2013.01); *C09K 5/045* (2013.01); *C09K 2205/104* (2013.01); *C09K 2205/24* (2013.01); *C10M 2207/2835* (2013.01); *C10N 2220/302* (2013.01); *C10N 2240/30* (2013.01)

(58) Field of Classification Search
CPC .............. C09K 2205/126; C09K 5/045; C09K 2205/22; C09K 2205/122; C09K 2205/24
See application file for complete search history.

(56) References Cited

U.S. PATENT DOCUMENTS

| | | | |
|---|---|---|---|
| 2007/0032391 A1* | 2/2007 | Tagawa | C10M 171/008 508/421 |
| 2012/0159976 A1* | 6/2012 | Kontomaris | C09K 5/045 62/115 |
| 2012/0167599 A1* | 7/2012 | Kontomaris | C09K 5/045 62/77 |
| 2013/0099154 A1* | 4/2013 | Boussand | C09K 5/045 252/68 |
| 2013/0298581 A1* | 11/2013 | Kontomaris | C09K 5/045 62/98 |
| 2015/0376543 A1* | 12/2015 | Saito et al. | C10M 169/04 252/68 |
| 2016/0347982 A1* | 12/2016 | Fukushima | C09K 5/045 |
| 2018/0002506 A1* | 1/2018 | Nappa | C09K 3/30 |

FOREIGN PATENT DOCUMENTS

| | | |
|---|---|---|
| CN | 103890155 A | 6/2014 |
| JP | 2014-005418 A | 1/2014 |
| WO | WO 2005/042663 A1 | 5/2005 |
| WO | WO 2010/141669 A1 | 12/2010 |
| WO | WO 2011/091404 A1 | 7/2011 |
| WO | WO 2013/062058 A1 | 5/2013 |
| WO | WO2014/132676 A1 * | 4/2014 |
| WO | WO 2014/172272 A1 | 10/2014 |

OTHER PUBLICATIONS

Japan Patent Office, International Search Report issued in International Application No. PCT/JP2016/056048 (dated Mar. 22, 2016).
Taiwanese Intellectual Property Office, Office Action issued in Taiwanese Application No. 105106371 (dated Oct. 24, 2016).
International Bureau of WIPO, International Preliminary Report on Patentability issued in International Application No. PCT/JP2016/056048 (dated Sep. 14, 2017).

* cited by examiner

*Primary Examiner* — John R Hardee
(74) *Attorney, Agent, or Firm* — Leydig, Voit & Mayer, Ltd.

(57) ABSTRACT

The invention provides a refrigerating machine oil comprising as a base oil at least one oxygen-containing oil having a carbon/oxygen molar ratio of 2.5 or more and 5.8 or less, and being used in combination with a (Z)-1,1,1,4,4,4-hexafluoro-2-butene refrigerant.

9 Claims, No Drawings

REFRIGERATOR OIL AND WORKING FLUID COMPOSITION FOR REFRIGERATORS

CROSS-REFERENCE TO RELATED APPLICATIONS

This patent application is the U.S., national phase of international Application No. PCT/JP2016/056048, filed on Feb. 29, 2016, which claims the benefit of Japanese Patent Application No. 2015-040387, filed Mar. 2, 2015, the disclosures of which are incorporated herein by reference in their entireties for all purposes.

TECHNICAL FIELD

The present invention relates to a refrigerating machine oil and a working fluid composition for a refrigerating machine.

BACKGROUND ART

CFC (chlorofluorocarbon) and HCFC (hydrochlorofluorocarbon), which have been heretofore used as a refrigerant for refrigerating equipment, are now subject to regulation from the recent fear of ozone layer destruction, and alternatively HFC (hydrofluorocarbon) has come to be used as a refrigerant. However, among HFC refrigerants, HFC-134a, which has been used for a car air-conditioner refrigerant like a standard material, is also subject to regulation in Europe, because its global warming potential (GWP) is high, despite its zero ozone depletion potential (ODP).

Under such circumstances, there is an urgent need to develop a refrigerant that has little influence on the ozone layer and exhibits low GWP. For example, Patent Literature 1 discloses a (Z)-1,1,1,4,4,4-hexafluoro-2-butene (HFO-1336mzz) refrigerant as a refrigerant that has little influence on the ozone layer and exhibits low GWP.

In the case of a conventional refrigerant such as CFC and HCFC, a refrigerating machine oil containing a hydrocarbon oil, such as a mineral oil and an alkylbenzene, has been used favorably, however, since a refrigerating machine oil may exhibit, depending on the kind of a coexisting refrigerant, an unpredictable behavior in terms of compatibility with a refrigerant, lubricity, viscosity of a solution with a refrigerant, and thermal and chemical stability, development of a refrigerating machine oil for each refrigerant becomes necessary.

CITATION LIST

Patent Literature

Patent Literature 1: International Publication No. WO 2010/141669

SUMMARY OF INVENTION

Technical Problem

An object of the present invention is to provide a refrigerating machine oil superior in suitability with a (Z)-1,1,1,4,4,4-hexafluoro-2-butene (HFO-1336mzz) refrigerant, and a working fluid composition for a refrigerating machine containing the refrigerating machine oil.

Solution to Problem

The present invention provides a refrigerating machine oil comprising as a base oil at least one oxygen-containing oil having a carbon/oxygen molar ratio of 2.5 or more and 5.8 or less, and being used with a (Z)-1,1,1,4,4,4-hexafluoro-2-butene refrigerant.

The present invention provides a working fluid composition for a refrigerating machine comprising a refrigerating machine oil comprising as a base oil at least one oxygen-containing oil having a carbon/oxygen molar ratio of 2.5 or more and 5.8 or less, and a (Z)-1,1,1,4,4,4-hexafluoro-2-butene refrigerant.

It is preferable that the refrigerating machine oil comprises, as the oxygen-containing oil, an ester of a polyhydric alcohol and a fatty acid wherein a ratio of C4 to C20 fatty acids in the fatty acid is from 20 to 100% by mole.

It is preferable that the refrigerating machine oil comprises, as the oxygen-containing oil, an ester of a polyhydric alcohol and a fatty acid wherein a ratio of C4 to C20 branched fatty acids in the fatty acid is from 20 to 100% by mole.

Advantageous Effects of Invention

According to the present invention, a refrigerating machine oil superior in suitability with a (Z)-1,1,1,4,4,4-hexafluoro-2-butene (HFO-1336mzz) refrigerant, and a working fluid composition for a refrigerating machine containing the refrigerating machine oil can be provided.

DESCRIPTION OF EMBODIMENTS embodiments of the present invention will be described below in detail.

A refrigerating machine oil according to the present embodiment comprises as a base oil at least one oxygen-containing oil having a carbon/oxygen molar ratio of 2.5 or more and 5.8 or less, and is used with a (Z)-1,1,1,4,4,4-hexafluoro-2-butene refrigerant.

A working fluid composition for a refrigerating machine according to the present embodiment comprises a refrigerating machine oil containing as a base oil at least one oxygen-containing oil having a carbon/oxygen molar ratio of 2.5 or more and 5.8 or less, and a (Z)-1,1,1,4,4,4-hexafluoro-2-butene refrigerant. A working fluid composition for a refrigerating machine according to the present embodiment includes a mode, which contains a refrigerating machine oil according to the present embodiment and a (Z)-1,1,1,4,4,4-hexafluoro-2-butene refrigerant.

A base oil is at least one oxygen-containing oil, in which the carbon/oxygen molar ratio is from 2.5 or more and 5.8 or less. The carbon/oxygen molar ratio of such an oxygen-containing oil is preferably 3.2 or more, and more preferably 4.0 or more from the viewpoints of compatibility with a refrigerant and stability, and preferably 5.0 or less. A carbon/oxygen molar ratio can be analyzed quantitatively by a commonly used element analysis method. Examples of an analysis method of carbon include methods of a thermal conductivity method or a gas chromatography method after conversion to carbon dioxide by burning. As an analysis method of oxygen, a carbonic reduction method is commonly used, by which the oxygen is converted using carbon to carbon monoxide and then analyzed quantitatively, and the Shutze-Unterzaucher method has been broadly put into practical use.

Examples of an oxygen-containing oil include an ester, polyvinyl ether, polyalkylene glycol carbonate, a ketone, polyphenyl ether, silicone, polysiloxane, and perfluoroether; and an ester, polyvinyl ether, and polyalkylene glycol are preferable, and an ester is more preferable.

Examples of an ester include an aromatic ester, a dibasic ester, a polyester, a complex ester, a carbonic ester, and a mixture thereof; and a polyester is preferable.

As an aromatic ester, an ester of a mono to hexacarboxylic, preferably mono to tetracarboxylic, more preferably mono to tricarboxylic aromatic acid, and a C1 to C18, preferably C1 to C12 aliphatic alcohol, or the like is used. Examples of a mono to hexacarboxylic aromatic acid include benzoic acid, phthalic acid, isophthalic acid, terephthalic acid, trimellitic acid, pyromellitic acid, and a mixture thereof. Examples of a C1 to C18 aliphatic alcohol include methanol, ethanol, propanol, butanol, pentanol, hexanol, heptanol, octanol, nonanol, decanol, undecanol, dodecanol, tridecanol, tetradecanol, pentadecanol, hexadecanol, heptadecanol, octadecanol, and a mixture thereof. The C1 to C18 aliphatic alcohol may be linear or branched. With respect to a dicarboxylic or higher aromatic acid, a simple ester constituted with an alcohol consisting of one aliphatic alcohol may be used, or a complex ester constituted with alcohols consisting of two or more aliphatic alcohols may be also used.

As a dibasic ester, esters of a C5 to C10 dibasic acid, such as glutaric acid, adipic acid, pimelic acid, suberic acid, azelaic acid, and sebacic acid, and a C1 to C15 monohydric alcohol having a linear or branched alkyl group, such as methanol, ethanol, propanol, butanol, pentanol, hexanol, heptanol, octanol, nonanol, decanol, undecanol, dodecanol, tridecanol, tetradecanol, and pentadecanol, as well as a mixture thereof may be used preferably.

A polyester is an ester synthesized from a polyhydric alcohol and a fatty acid. A polyester may be a partial ester, in which a part of hydroxy groups of a polyhydric alcohol is not esterified and remains as a hydroxy group; may be a complete ester, in which all of hydroxy groups are esterified; or may be a mixture of a partial ester and a complete ester. The hydroxyl value of a polyester is preferably 10 mg KOH/g or less, more preferably 5 mg KOH/g or less, and further preferably 3 mg KOH/g or less.

As the fatty acid constituting the polyester there is preferably used a saturated fatty acid. The number of carbon atoms of the fatty acid is preferably 4 to 20. Examples of C4 to C20 fatty acids include butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, and icosanoic acid. These C4 to C20 fatty acids may be linear or branched and are preferably branched.

The ratio of C4 to C20 fatty acids in fatty acids constituting a polyester is preferably from 20 to 100% by mole, more preferably from 50 to 100% by mole, further preferably from 70 to 100% by mole, and especially preferably from 90 to 100% by mole. It is more preferable that the ratio of C4 to C18 fatty acids be within the above range, it is further preferable that the ratio of C4 to C9 fatty acids be within the above range, and it is especially preferable that the ratio of C5 to C9 fatty acids be within the above range.

The ratio of C4 to C20 branched fatty acids in fatty acids constituting the polyester is preferably from 20 to 100% by mole, more preferably from 50 to 100% by mole, further preferably from 70 to 100% by mole, and especially preferably from 90 to 100% by mole. It is more preferable that the ratio of C4 to C18 branched fatty acids be within the above range, it is further preferable that the ratio of C4 to C9 branched fatty acids be within the above range, and it is especially preferable that the ratio of C5 to C9 branched fatty acids be within the above range.

Preferred as the C4 to C20 branched fatty acids are fatty acids branched at α position and/or β position; more preferred are 2-methylpropanoic acid, 2-methylbutanoic acid, 2-methylpentanoic acid, 2-methylhexanoic acid, 2-ethylpentanoic acid, 2-methylheptanoic acid, 2-ethylhexanoic acid, 3,5,5-trimethylhexanoic acid, and 2-ethylhexadecanoic acid, and further preferred are 2-ethylhexanoic acid and 3,5,5-trimethylhexanoic acid.

The fatty acids may include a fatty acid other than the C4 to C20 fatty acids. Examples of the fatty acid other than the C4 to C20 fatty acids include heneicosanoic acid, docosanoic acid, tricosanoic acid, and tetracosanoic acid. These fatty acids may be linear or branched.

As a polyhydric alcohol constituting a polyester, a polyhydric alcohol having 2 to 6 hydroxy groups may be used preferably. The number of carbon atoms of a polyhydric alcohol is preferably 4 or more, more preferably 5 or more; and is preferably 12 or less, and more preferably 10 or less. Hindered alcohols such as neopentylglycol, trimethylolethane, trimethylolpropane, trimethylolbutane, di-(trimethylolpropane), tri-(trimethylolpropane), pentaerythritol, and dipentaerythritol are preferred as the polyhydric alcohol. The polyhydric alcohol is preferably pentaerythritol, dipentaerythritol, or a mixed ester of pentaerythritol and dipentaerythritol, and is more preferably pentaerythritol or a mixed alcohol of pentaerythritol and dipentaerythritol, because they are especially superior in compatibility with a refrigerant and hydrolysis stability.

A complex ester is an ester of a fatty acid and a dibasic acid with a monohydric alcohol and a polyol. The complex ester may be an ester of at least two acids selected from monofatty acids and dibasic acids with a monohydric alcohol and/or a polyhydric alcohol, or may be an ester of a monofatty acid and/or a dibasic acid with at least two alcohols selected from monohydric alcohols and polyhydric alcohols. The complex ester may be an ester of a dibasic acid with at least two alcohols selected from monohydric alcohols and polyhydric alcohols. As a fatty acid, a dibasic acid, a monohydric alcohol, and a polyol, those exemplified in the descriptions of a dibasic ester and a polyester, or the like may be used.

A carbonic ester is a compound having a carbonic ester structure represented by the following formula (A) in a molecule. A carbonic ester may have one or more carbonic ester structures in a molecule.

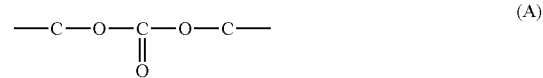

(A)

As an alcohol to constitute a carbonic ester the aliphatic alcohols, the polyols, etc. described above may be used, and also a product obtained by adding a polyglycol to a polyglycol or a polyol may be used. A carbonic ester may be constituted with carbonic acid and a fatty acid and/or a dibasic acid.

Among carbonic esters, a carbonic ester having a structure represented by the following formula (A-1) is preferable.

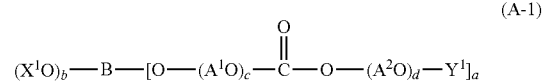

(A-1)

In the formula (A-1), $X^1$ represents a hydrogen atom, an alkyl group, a cycloalkyl group, or a group represented by the following formula (A-2):

$$Y^2-(OA^3)_e- \quad (A-2)$$

wherein $Y^2$ represents a hydrogen atom, an alkyl group, or a cycloalkyl group; $A^3$ represents a C2 to C4 alkylene group; and e represents an integer of 1 to 50; $A^1$ and $A^2$ may be the same or different and each represent a C2 to C4 alkylene group; $Y^1$ represents a hydrogen atom, an alkyl group, or a cycloalkyl group; B represents a residue of a compound having 3 to 20 hydroxy groups; a represents an integer of 1 to 20, and b represents an integer of 0 to 19, wherein a+b=3 to 20; c represents an integer of 0 to 50; and d represents an integer of 1 to 50.

In the formula (A-1), $X^1$ represents a hydrogen atom, an alkyl group, a cycloalkyl group, or a group represented by the above formula (A-2). The number of carbon atoms of the alkyl group is preferably from 1 to 24, more preferably from 1 to 18, and further preferably from 1 to 12. The alkyl group may be linear or branched.

Examples of a C1 to C24 alkyl group include a methyl group, an ethyl group, a n-propyl group, an isopropyl group, a n-butyl group, an isobutyl group, a sec-butyl group, a tert-butyl group, a linear or branched pentyl group, a linear or branched hexyl group, a linear or branched heptyl group, a linear or branched octyl group, a linear or branched nonyl group, a linear or branched decyl group, a linear or branched undecyl group, a linear or branched dodecyl group, a linear or branched tridecyl group, a linear or branched tetradecyl group, a linear or branched pentadecyl group, a linear or branched hexadecyl group, a linear or branched heptadecyl group, a linear or branched octadecyl group, a linear or branched nonadecyl group, a linear or branched icosyl group, a linear or branched henicosyl group, a linear or branched docosyl group, a linear or branched tricosyl group, and a linear or branched tetracosyl group.

Examples of a cycloalkyl group include a cyclopentyl group, a cyclohexyl group, and a cycloheptyl group.

Examples of a C2 to C4 alkylene group represented by $A^3$ in the formula (A-2) include an ethylene group, a propylene group, a trimethylene group, a butylene group, a tetramethylene group, a 1-methyltrimethylene group, a 2-methyltrimethylene group, a 1,1-dimethylethylene group, and a 1,2-dimethylethylene group $Y^1$ and $Y^2$ are each independently a hydrogen atom, an alkyl group, or a cycloalkyl group. The number of carbon atoms of the alkyl group is preferably from 1 to 24, more preferably from 1 to 18, and further preferably from 1 to 12. The alkyl group may be linear or branched. Examples of a C1 to C24 alkyl group include the groups exemplified in the description of $X^1$. Examples of a cycloalkyl group include a cyclopentyl group, a cyclohexyl group, and a cycloheptyl group.

Among others, a hydrogen atom, or a C1 to C12 alkyl group is preferable as $Y^1$ and $Y^2$; and a hydrogen atom, a methyl group, an ethyl group, a n-propyl group, an isopropyl group, a n-butyl group, an isobutyl group, a sec-butyl group, a tert-butyl group, a n-pentyl group, an isopentyl group, a neopentyl group, a n-hexyl group, an isohexyl group, a n-heptyl group, an isoheptyl group, a n-octyl group, an isooctyl group, a n-nonyl group, an isononyl group, a n-decyl group, an isodecyl group, a n-undecyl group, an isoundecyl group, a n-dodecyl group, or an isododecyl group is more preferable.

As $X^1$, a hydrogen atom, a C1 to C12 alkyl group, or a group represented by the formula (A-2) is preferable; and a hydrogen atom, a methyl group, an ethyl group, a n-propyl group, an isopropyl group, a n-butyl group, an isobutyl group, a sec-butyl group, a tert-butyl group, a n-pentyl group, an isopentyl group, a neopentyl group, a n-hexyl group, an isohexyl group, a n-heptyl group, an isoheptyl group, a n-octyl group, an isooctyl group, a n-nonyl group, an isononyl group, a n-decyl group, an isodecyl group, a n-undecyl group, an isoundecyl group, a n-dodecyl group, an isododecyl group, or a group represented by the formula (A-2) is more preferable.

Examples of a compound having 3 to 20 hydroxy groups leaving B as a residue include the aforedescribed polyols.

$A^1$ and $A^2$ may be the same or different and each represent a C2 to C4 alkylene group. Examples thereof include an ethylene group, a propylene group, a trimethylene group, a butylene group, a tetramethylene group, a 1-methyltrimethylene group, a 2-methyltrimethylene group, a 1,1-dimethylethylene group, and a 1,2-dimethylethylene group.

In the formulas (A-1) and (A-2), c, d and e each represents the degree of polymerization of a polyoxyalkylene moiety. These polyoxyalkylene moieties may each have one oxyalkylene group or two or more oxyalkylene groups. When the polyoxyalkylene moieties have two or more polyoxyalkylene groups, a polymerization type of each oxyalkylene group may be random copolymerization or block copolymerization.

A polyvinyl ether has a structural unit represented by the following formula (1):

wherein $R^1$, $R^2$ and $R^3$ may be the same or different from each other and each represent independently a hydrogen atom, or a hydrocarbon group; $R^4$ represents a divalent hydrocarbon group, or a divalent ether-bonded oxygen-containing hydrocarbon group; $R^5$ represents a hydrocarbon group; and m represents an integer of 0 or higher. When m is 2 or higher, a plurality of $R^4$ may be the same or different from each other.

The number of carbon atoms of a hydrocarbon group represented by $R^1$, $R^2$ or $R^3$ in the formula (1) is preferably 1 or more, more preferably 2 or more, and further preferably 3 or more, and preferably 8 or less, more preferably 7 or less, and further preferably 6 or less. At least one of $R^1$, $R^2$ and $R^3$ in the formula (1) is preferably a hydrogen atom, and more preferably all of them are hydrogen atoms.

The number of carbon atoms of a divalent hydrocarbon group and an ether-bonded oxygen-containing hydrocarbon group represented by $R^4$ in the formula (1) is preferably 1 or more, more preferably 2 or more, and further preferably 3 or more; and preferably 10 or less, more preferably 8 or less, and further preferably 6 or less. An ether-bonded oxygen-containing hydrocarbon group represented by $R^4$ in the formula (1) may be, for example, a hydrocarbon group having oxygen in a side chain to form an ether bond.

$R^5$ in the formula (1) is preferably a C1 to C20 hydrocarbon group. Examples of the hydrocarbon group include an alkyl group, a cycloalkyl group, a phenyl group, an aryl group, and an arylalkyl group. Among them, an alkyl group is preferable, and a C1 to C5 alkyl group is more preferable.

In the formula (1), m is preferably 0 or higher, more preferably 1 or higher, and further preferably 2 or higher; and preferably 20 or lower, more preferably 18 or lower, and further preferably 16 or lower. The average value of m in all structural units constituting polyvinyl ether is preferably from 0 to 10.

Polyvinyl ether may be a homopolymer constituted with one selected from structural units represented by the formula (1), may be a copolymer constituted with two or more selected from structural units represented by the formula (1), or may be a copolymer constituted with a structural unit represented by the formula (1) and another structural unit. When polyvinyl ether is a copolymer, lubricity, insulation properties, hygroscopicity, etc. can be further improved, while the compatibility of a refrigerating machine oil with a refrigerant is satisfied. In this case, various properties of the refrigerating machine oil as described above can be controlled to desired levels by selecting appropriately the kind of a monomer to be used as a source material, the kind of an initiator, the ratio of structural units in a copolymer, etc. Therefore a refrigerating machine oil meeting requirements on lubricity, compatibility, etc. which vary depending on a compressor type in a refrigerating system or an air-conditioning system, a material of a lubrication unit, a refrigerating capacity, the kind of a refrigerant, or the like, can be obtained freely. A copolymer may be either of a block copolymer, and a random copolymer.

When polyvinyl ether is a copolymer, it is preferable that the copolymer have a structural unit (1-1) represented by the formula (1) where $R^5$ is a C1 to C3 alkyl group, and a structural unit (1-2) represented by the formula (1) where $R^5$ is a C3 to C20, preferably C3 to C10, further preferably C3 to C8 alkyl group. As $R^5$ in the structural unit (1-1), an ethyl group is especially preferable, and as $R^5$ in the structural unit (1-2), an isobutyl group is especially preferable. When polyvinyl ether is a copolymer having structural units (1-1) and (1-2), the molar ratio of the structural unit (1-1) to the structural unit (1-2) is preferably from 5:95 to 95:5, more preferably from 20:80 to 90:10, and further preferably from 70:30 to 90:10. When the molar ratio is within the range, the compatibility with a refrigerant can be improved and the hygroscopicity tends to be lowered.

Although polyvinyl ether may be constituted solely with a structural unit represented by the formula (1), it may be also a copolymer having additionally a structural unit represented by the following formula (2). In such a case, the copolymer may be either of a block copolymer and a random copolymer.

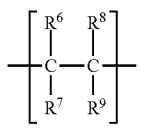

In the formula, $R^6$ to $R^9$ may be the same or different from each other and each represent independently a hydrogen atom or a C1 to C20 hydrocarbon group.

The polyvinyl ether may be produced by polymerization of a vinyl ether monomer according to the formula (1), or by copolymerization of a vinyl ether monomer according to the formula (1) and a hydrocarbon monomer with an olefinic double bond according to the formula (2). As a vinyl ether monomer according to a structural unit represented by the formula (1), a monomer represented by the following formula (3) is appropriate.

In the formula, $R^1$, $R^2$, $R^3$, $R^4$, $R^5$ and m are as defined for $R^1$, $R^2$, $R^3$, $R^4$, $R^5$ and m, respectively, in the formula (1).

It is preferable that the polyvinyl ether have the following end structure (A) or (B).

(A) A structure, in which an end is represented by the formula (4) or (5), and the other end is represented by the formula (6) or (7).

In the formula, $R^{11}$, $R^{21}$ and $R^{31}$ may be the same or different from each other and each represent independently a hydrogen atom or a C1 to C8 hydrocarbon group; $R^{41}$ represents a C1 to C10 divalent hydrocarbon group, or divalent ether-bonded oxygen-containing hydrocarbon group; $R^{51}$ represents a C1 to 20 hydrocarbon group; and m has the same defined meaning as m in the formula (1). When m is 2 or higher, a plurality of $R^{41}$ may be the same or different from each other.

In the formula, $R^{61}$, $R^{71}$, $R^{81}$ and $R^{91}$ may be the same or different from each other and each represent independently a hydrogen atom or a C1 to C20 hydrocarbon group.

In the formula, $R^{12}$, $R^{22}$ and $R^{32}$ may be the same or different from each other and each represent independently a hydrogen atom or a C1 to C8 hydrocarbon group; $R^{42}$ represents a C1 to C10 divalent hydrocarbon group or divalent ether-bonded oxygen-containing hydrocarbon group; $R^{52}$ represents a C1 to 20 hydrocarbon group; and m has the same defined meaning as m in the formula (1). When m is 2 or higher, a plurality of $R^{41}$ may be the same or different.

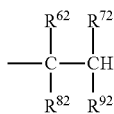

(7)

In the formula, $R^{62}$, $R^{72}$, $R^{82}$ and $R^{92}$ may be the same or different from each other and each represent independently a hydrogen atom or a C1 to C20 hydrocarbon group.)

(B) A structure, in which an end is represented by the formula (4) or (5), and the other end is represented by the following formula (8).

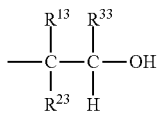

(8)

In the formula, $R^{13}$, $R^{23}$ and $R^{33}$ may be the same or different from each other and each represent independently a hydrogen atom or a C1 to C8 hydrocarbon group.

Among the polyvinyl ethers, polyvinyl ethers of (a), (b), (c), (d) and (e) described below are especially appropriate as a main component (base oil) of a refrigerating machine oil.

(a) Polyvinyl ether having a structure, in which an end is represented by the formula (4) or (5), and the other end is represented by the formula (6) or (7), wherein in the formula (1) all of $R^1$, $R^2$ and $R^3$ are a hydrogen atom; m is an integer of 0 to 4; $R^4$ is a C2 to C4 divalent hydrocarbon group; and $R^5$ is a C1 to C20 hydrocarbon group.

(b) Polyvinyl ether having solely a structural unit represented by the formula (1), and a structure, in which an end is represented by the formula (4), and the other end is represented by the formula (6), wherein in the formula (1) all of $R^1$, $R^2$ and $R^3$ are a hydrogen atom; m is an integer of 0 to 4; $R^4$ is a C2 to C4 divalent hydrocarbon group; and $R^5$ is a C1 to C20 hydrocarbon group.

(c) Polyvinyl ether having a structure, in which an end is represented by the formula (4) or (5), and the other end is represented by the formula (8), wherein in the formula (1) all of $R^1$, $R^2$ and $R^3$ are a hydrogen atom; m is an integer of 0 to 4; $R^4$ is a C2 to C4 divalent hydrocarbon group; and $R^5$ is a C1 to C20 hydrocarbon group.

(d) Polyvinyl ether having solely a structural unit represented by the formula (1), and a structure, in which an end is represented by the formula (5), and the other end is represented by the formula (8), wherein in the formula (1) all of $R^1$, $R^2$ and $R^3$ are a hydrogen atom; m is an integer of 0 to 4; $R^4$ is a C2 to C4 divalent hydrocarbon group; and $R^5$ is a C1 to C20 hydrocarbon group.

(e) Polyvinyl ether of any one of the above (a), (b), (c), and (d), having a structural unit, in which $R^5$ in the formula (1) is a C1 to C3 hydrocarbon group, and a structural unit, in which the $R^5$ is a C3 to C20 hydrocarbon group.

The weight average molecular weight of the polyvinyl ether is preferably 500 or more and more preferably 600 or more, and is preferably 3000 or less, more preferably 2000 or less, and further preferably 1500 or less. When the weight average molecular weight of the polyvinyl ether is 500 or more, lubricity in the coexistence of a refrigerant is superior. When the weight average molecular weight is 3000 or less, the composition range, where favorable compatibility with a refrigerant is exhibited at a low temperature, is widened so that poor lubrication in a refrigerant compressor, or impediment of heat exchange in an evaporator, can be prevented.

The number average molecular weight of the polyvinyl ether is preferably 500 or more and more preferably 600 or more, and is preferably 3000 or less, more preferably 2000 or less, and further preferably 1500 or less. When the number average molecular weight of the polyvinyl ether is 500 or more, lubricity in the coexistence of a refrigerant is superior. When the number average molecular weight is 3000 or less, the composition range, where favorable compatibility with a refrigerant is exhibited at a low temperature, is widened so that poor lubrication in a refrigerant compressor, or impediment of heat exchange in an evaporator, can be prevented.

The weight average molecular weight and number average molecular weight of the polyvinyl ether, as used herein, respectively mean a weight average molecular weight and number average molecular weight (polystyrene (standard sample) equivalents) determined by GPC analysis. The weight average molecular weight and number average molecular weight of the polyvinyl ether can be measured, for example, as follows.

Chloroform is used as a solvent, and a diluted solution of polyvinyl ether having a concentration of 1% by mass is prepared. The solution is analyzed using a GPC system (Waters Alliance 2695). The analysis is carried out at a solvent flow rate of 1 ml/min using a column adapted for analysis in the molecular weight range of 100 to 10000 and a refractive index detector. A calibration curve is separately prepared by determining the relationship between column retention time and molecular weight using a standard polystyrene sample whose molecular weight is clearly known, and the molecular weight of an analyte is determined from the retention time obtained.

Although in a production process for polyvinyl ether, an unsaturated group such as an aryl group may be formed in a molecule due to a possible side reaction, polyvinyl ether with a low degree of unsaturation to be caused by an unsaturated group, etc. is preferable as polyvinyl ether from the viewpoints of enhancement of the thermal stability of polyvinyl ether itself, suppression of sludge generation due to polymer formation, and suppression of formation of a peroxide due to deterioration of antioxidative properties (oxidation resistance). The degree of unsaturation of polyvinyl ether is preferably 0.04 meq/g or less, more preferably 0.03 meq/g or less, and further preferably 0.02 meq/g or less. The peroxide value of polyvinyl ether is preferably 10.0 meq/kg or less, more preferably 5.0 meq/kg or less, and further preferably 1.0 meq/kg. The carbonyl value of polyvinyl ether is preferably 100 ppm by weight or less, more preferably 50 ppm by weight or less, and further preferably 20 ppm by weight or less. The hydroxyl value of polyvinyl ether is preferably 10 mg KOH/g or less, more preferably 5 mg KOH/g or less, and further preferably 3 mg KOH/g or less.

The degree of unsaturation, a peroxide value, and a carbonyl value as used herein are each a value measured according to the Standard Methods for the Analysis of Fats, Oils and Related Materials established by Japan Oil Chemists' Society. Namely, with respect to the degree of unsaturation as used herein, a sample is reacted with a Wijs solution (ICl-acetic acid solution), the reaction liquid is left standing in a dark place, then excessive ICl is reduced to iodine, the iodine analyte is titrated with sodium thiosulfate to calculate an iodine value, and the iodine value is reduced to a vinyl equivalent value (meq/g) as the degree of unsaturation. With respect to peroxide value as used herein, potassium iodide is added to a sample, the produced free iodine is measured by titration with sodium thiosulfate, and the free iodine amount is reduced to milliequivalent figure based on 1 kg of sample (meq/kg) as a peroxide value. With respect to carbonyl value as used herein, 2,4-dinitrophenyl hydrazine is reacted with a sample to generate a chromogenic quinoid ion, the absorbance at 480 nm is measured for the reacted sample, and a value reduced to a carbonyl amount (ppm by weight) is determined as a carbonyl value based on a calibration curve prepared in advance using cinnamaldehyde as a standard material. The hydroxyl value as used herein means a hydroxyl value measured according to JIS K0070: 1992.

Polyalkylene glycol may have various chemical structures, and examples of a basic compound thereof include polyethylene glycol, polypropylene glycol, and polybutylene glycol. Unit structures of polyalkylene glycol are oxyethylene, oxypropylene, and oxybutylene. Polyalkylene glycols having such unit structures can be produced by ring-opening polymerization using ethylene oxide, propylene oxide, or butylene oxide, respectively, as a source material monomer.

Examples of polyalkylene glycol include a compound represented by the following formula (9):

$$R^{\alpha}-[(OR^{\beta})_f-OR^{\gamma}]_g \quad (9)$$

wherein $R^{\alpha}$ represents a hydrogen atom, a C1 to C10 alkyl group, a C2 to C10 acyl group, or a residue of a compound having 2 to 8 hydroxy groups; $R^{\beta}$ represents a C2 to C4 alkylene group; $R^{\gamma}$ represents a hydrogen atom, a C1 to C10 alkyl group, or a C2 to C10 acyl group; f represents an integer of 1 to 80; and g represents an integer of 1 to 8.

An alkyl group represented by $R^{\alpha}$, or $R^{\gamma}$ in the formula (9) may be any of linear, branched, and cyclic. The number of carbon atoms of the alkyl group is preferably from 1 to 10, and more preferably from 1 to 6. When the number of carbon atoms of the alkyl group is beyond 10, the compatibility with a refrigerant tends to decline.

An alkyl group moiety of an acyl group represented by $R^{\alpha}$, or $R^{\gamma}$ may be any of linear, branched, and cyclic. The number of carbon atoms of the acyl group is preferably from 2 to 10, and more preferably from 2 to 6. When the number of carbon atoms of the acyl group is beyond 10, the compatibility with a refrigerant decreases, so that phase separation may occur.

When groups represented by $R^{\alpha}$, and $R^{\gamma}$ are both alkyl groups, or both acyl groups, the groups represented by $R^{\alpha}$, and $R^{\gamma}$ may be the same or different. When g is 2 or higher, a plurality of groups represented by $R^{\alpha}$ and $R^{\gamma}$ in the same molecule may be the same or different.

In a case where a group represented by $R^{\alpha}$ is a residue of a compound having 2 to 8 hydroxy groups, the compound may be open-chain or cyclic.

With respect to polyalkylene glycol represented by the formula (9), at least one of $R^{\alpha}$, and $R^{\gamma}$ is preferably an alkyl group (more preferably a C1 to C4 alkyl group), and especially preferably a methyl group from the viewpoint of compatibility with a refrigerant.

From the viewpoint of thermal and chemical stability, both of $R^{\alpha}$ and $R^{\gamma}$ are preferably an alkyl group (more preferably a C1 to C4 alkyl group), and further preferably both are methyl groups.

From the viewpoints of production easiness and cost, it is preferable that either one of $R^{\alpha}$ or $R^{\gamma}$ be an alkyl group (more preferably a C1 to C4 alkyl group), and the other be a hydrogen atom, and more preferable that one be a methyl group and the other be a hydrogen atom. From the viewpoints of lubricity and sludge solubility, it is preferable that $R^{\alpha}$ and $R^{\gamma}$ be each a hydrogen atom.

$R^{\beta}$ in the formula (9) represents a C2 to C4 alkylene group, and examples of such an alkylene group include an ethylene group, a propylene group, and a butylene group. Examples of an oxyalkylene group, which is represented by $OR^{\beta}$, include an oxyethylene group, an oxypropylene group, and an oxybutylene group. Meanwhile, an polyoxyalkylene group represented by $(OR^{\beta})_f$ may be composed of one oxyalkylene group, or composed of two or more oxyalkylene groups.

Among polyalkylene glycols represented by the formula (9), a copolymer including an oxyethylene group (EO) and an oxy propylene group (PO) is preferable from the viewpoints of compatibility with a refrigerant and viscosity-temperature characteristics. In this case, from the viewpoints of seizure load, and viscosity-temperature characteristics, the content of oxyethylene group based on the total of oxyethylene group and oxy propylene group (EO/(PO+EO)) is preferably in a range of 0.1 to 0.8, and more preferably in a range of 0.3 to 0.6.

From the viewpoints of hygroscopicity and thermal and oxidative stability, EO/(PO+EO) is preferably in a range of 0 to 0.5, more preferably in a range of 0 to 0.2, and most preferably 0 (namely, a propylene oxide homopolymer).

In the formula (9), f means a repetition number (degree of polymerization) of an oxyalkylene group $OR^{\beta}$, and is an integer of 1 to 80. Meanwhile g is an integer of 1 to 8. For example, when $R^{\alpha}$ is an alkyl group or an acyl group, g is 1. When $R^{\alpha}$ is a residue of a compound having 2 to 8 hydroxy groups, g is equal to the number of hydroxy groups owned by the compound.

On the product of f and g (f×g), the average value of f×g is preferably 6 to 80 for the sake of well-balanced satisfaction of the required performances described above as a refrigerating machine oil.

The weight average molecular weight of the polyalkylene glycol represented by the general formula (9) is preferably 500 or more and more preferably 600 or more and is preferably 3000 or less, more preferably 2000 or less, and further preferably 1500 or less. It is preferable that f and g in the general formula (9) be numbers that allow the weight average molecular weight of the polyalkylene glycol to satisfy the above conditions. When the weight average molecular weight of the polyalkylene glycol is 500 or more, lubricity in the coexistence of a refrigerant is superior. When the weight average molecular weight is 3000 or less, the composition range, where favorable compatibility with a refrigerant is exhibited at a low temperature, is widened so that poor lubrication in a refrigerant compressor, or impediment of heat exchange in an evaporator, can be prevented.

The number average molecular weight of polyalkylene glycol represented by formula (9) is preferably 500 or higher, and more preferably 600 or higher; and preferably 3000 or lower, more preferably 2000 or lower, and further preferably 1500 or lower. In the formula (9), f and g are preferably numbers that allow the number average molecular weight of polyalkylene glycol to satisfy the above condition. When the number average molecular weight of the polyalkylene glycol is 500 or more, lubricity in the coexistence of a refrigerant is superior. When the number average molecular weight is 3000 or less, the composition range, where favorable compatibility with a refrigerant is exhibited at a low temperature, is widened so that poor lubrication in a refrigerant compressor, or impediment of heat exchange in an evaporator, can be prevented.

The weight average molecular weight and number average molecular weight of the polyalkylene glycol, as used herein, respectively mean a weight average molecular weight and number average molecular weight (polypropylene glycol (standard sample) equivalents) determined by GPC analysis. The weight average molecular weight and number average molecular weight of the polyalkylene glycol can be measured, for example, as follows.

Chloroform is used as a solvent, and a diluted solution of polyalkylene glycol having a concentration of 1% by mass is prepared. The solution is analyzed using a GPC system (Waters Alliance 2695). The analysis is carried out at a solvent flow rate of 1 ml/min using a column adapted for analysis in the molecular weight range of 100 to 10000 and a refractive index detector. A calibration curve is separately prepared by determining the relationship between column retention time and molecular weight using a standard polypropylene glycol sample whose molecular weight is clearly known, and the molecular weight of an analyte is determined from the retention time obtained.

There is no particular restriction on the hydroxyl value of polyalkylene glycol, and it is 100 mg KOH/g or less, preferably 50 mg KOH/g or less, further preferably 30 mg KOH/g or less, and most preferably 10 mg KOH/g or less.

A polyalkylene glycol can be synthesized using a publicly known method ("Alkylene oxide polymer", Shibata Mitsuta et al., Kaibundo, published on 20 Nov. 1990). For example, to an alcohol ($R^\alpha OH$; $R^\alpha$ is as defined for $R^\alpha$ in the formula (9)) one or more predetermined alkylene oxides are addition-polymerized, and further a terminal hydroxy group is etherified or esterified to yield a polyalkylene glycol represented by the formula (9). In a case where two or more alkylene oxides are used in the production process, an obtainable polyalkylene glycol may be either of a random copolymer and a block copolymer; however from the viewpoint of tending to be superior in oxidative stability and lubricity, a block copolymer is preferable, but from the viewpoint of tending to be superior in low temperature flowability, a random copolymer is preferable.

The kinematic viscosity of polyalkylene glycol at 100° C. is preferably 5 mm$^2$/s or more, more preferably 6 mm$^2$/s or more, further preferably 7 mm$^2$/s or more, especially preferably 8 mm$^2$/s or more, and most preferably 10 mm$^2$/s or more; and preferably 20 mm$^2$/s or less, more preferably 18 mm$^2$/s, further preferably 16 mm$^2$/s or less, and especially preferably 15 mm$^2$/s or less. When the kinematic viscosity at 100° C. is less than the lower limit, the lubricity in the coexistence of a refrigerant becomes insufficient, on the other hand when it exceeds the upper limit, the composition range, where favorable compatibility with a refrigerant is exhibited, is narrowed, so that poor lubrication in a refrigerant compressor, or impediment of heat exchange in an evaporator becomes apt to occur. The kinematic viscosity of polyalkylene glycol at 40° C. is preferably 10 mm$^2$/s or more, and more preferably 20 mm$^2$/s or more; and preferably 200 mm$^2$/s or less, and more preferably 150 mm$^2$/s or less. When the kinematic viscosity at 40° C. is less than 10 mm$^2$/s, the lubricity or sealing of a compressor tends to deteriorate, on the other hand when it exceeds 200 mm$^2$/s, the composition range, where favorable compatibility with a refrigerant is exhibited also at a low temperature, is narrowed, so that poor lubrication in a refrigerant compressor, or impediment of heat exchange in an evaporator tends to occur easier.

The pour point of polyalkylene glycol is preferably −10° C. or lower, and more preferably −20° C. or lower; and is preferably −50° C. or higher. When a polyalkylene glycol with a pour point higher than −10° C. is used, the refrigerating machine oil tends to solidify in a refrigerant circulation system at a low temperature. The pour point as used herein means a pour point as defined in JIS K 2269.

In a production process of polyalkylene glycol represented by the formula (9), an alkylene oxide such as propylene oxide may occasionally cause a side reaction to form an unsaturated group such as an aryl group in a molecule. When an unsaturated group is formed in a polyalkylene glycol molecule, such a phenomenon that the thermal stability of polyalkylene glycol itself is lowered, that sludge is generated through formation of polymers, or that a peroxide is formed due to deterioration of antioxidative properties (oxidation resistance), is apt to occur. Especially, if a peroxide is formed, it will be degraded to form a compound having a carbonyl group, and then the compound having a carbonyl group generates sludge to clog frequently a capillary.

Therefore, as polyalkylene glycol, a polyalkylene glycol with a low degree of unsaturation originated from an unsaturated group, etc. is preferable. The degree of unsaturation of polyalkylene glycol is preferably 0.04 meq/g or less, more preferably 0.03 meq/g or less, and further preferably 0.02 meq/g or less. The peroxide value is preferably 10.0 meq/kg or less, more preferably 5.0 meq/kg or less, and further preferably 1.0 meq/kg. The carbonyl value is preferably 100 ppm by weight or less, more preferably 50 ppm by weight or less, and further preferably 20 ppm by weight or less.

For obtaining a polyalkylene glycol with a low degree of unsaturation, a low peroxide value, and a low carbonyl value, the reaction temperature for reacting propylene oxide is preferably 120° C. or less, and more preferably 110° C. or less. In a case where an alkali catalyst is used during production, for removing the same, an inorganic adsorption agent, such as active carbon, activated clay, bentonite, dolomite, and aluminosilicate, may be used, so that the degree of unsaturation is reduced. Increase of peroxide value, or carbonyl value can be also prevented by avoiding contact with oxygen to the extent possible during production or actual use of polyalkylene glycol, or by adding an antioxidant.

It is necessary for polyalkylene glycol to have a carbon/oxygen molar ratio within a certain range, and a polymer, in which the molar ratio is within the range, can be produced by selecting or adjusting the type of source material monomers, and the mixing ratio.

A base oil may further contain, for example, a hydrocarbon oil, such as a mineral oil, an olefin polymer, a naphthalene compound, and an alkylbenzene in addition to the oxygen-containing oil. The content of the oxygen-containing oil is preferably 5% by mass or more based on the total amount of a base oil, more preferably 30% by mass or more, and further preferably 95% by mass or more.

A refrigerating machine oil may, if necessary, contain additionally various additives. Examples of the additives include an acid scavenger, an antioxidant, an extreme-pressure agent, an oiliness agent, an antifoaming agent, a metal deactivator, an antiwear agent, a viscosity index improver, a pour-point depressant, and a detergent dispersant. The additive content is preferably 5% by mass or less based on the total amount of a refrigerating machine oil, and more preferably 2% by mass or less.

A refrigerating machine oil should preferably contain an acid scavenger among the listed additives from the viewpoints of improvement in thermal and chemical stability. Examples of an acid scavenger include an epoxy compound, and a carbodiimide compound.

On an epoxy compound, and examples thereof include a glycidyl ether type epoxy compound, a glycidyl ester type epoxy compound, an oxirane compound, an alkyloxirane compound, an alicyclic epoxy compound, an epoxidized fatty acid monoester, and an epoxidized vegetable oil. The epoxy compounds may be used singly or in combinations of two or more.

Examples of a glycidyl ether type epoxy compound include n-butylphenyl glycidyl ether, i-butylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether, decylphenyl glycidyl ether, decyl glycidyl ether, undecyl glycidyl ether, dodecyl glycidyl ether, tridecyl glycidyl ether, tetradecyl glycidyl ether, 2-ethylhexyl glycidyl ether, neopentyl glycol diglycidyl ether, trimethylolpropane triglycidyl ether, pentaerythritol tetraglycidyl ether, 1,6-hexanediol diglycidyl ether, sorbitol polyglycidyl ether, polyalkylene glycol monoglycidyl ether, and polyalkylene glycol diglycidyl ether.

Examples of a glycidyl ester type epoxy compound include glycidyl benzoate, glycidyl neodecanoate, glycidyl-2,2-dimethyl octanoate, glycidyl acrylate, and glycidyl methacrylate.

An alicyclic epoxy compound is a compound having a partial structure represented by the following formula (10):

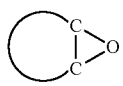

(10)

in which carbon atoms constituting an epoxy group are direct constituents of an alicyclic ring.

Examples of an alicyclic epoxy compound include 1,2-epoxycyclohexane, 1,2-epoxycyclopentane, 3',4'-epoxycyclohexylmethyl-3,4-epoxycyclohexane carboxylate, bis(3,4-epoxycyclohexylmethyl)adipate, exo-2,3-epoxynorbornane, bis(3,4-epoxy-6-methylcyclohexylmethyl)adipate, 2-(7-oxabicyclo[4.1.0]hept-3-yl)-spiro(1,3-dioxane-5,3'-[7]oxabicyclo[4.1.0]heptane, 4-(1'-methylepoxyethyl)-1,2-epoxy-2-methylcyclohexane, and 4-epoxyethyl-1,2-epoxycyclohexane.

Examples of an allyloxirane compound include 1,2-epoxystyrene, and alkyl-1,2-epoxystyrene.

Examples of an alkyloxirane compound include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,2-epoxyoctadecane, 1,2-epoxynonadecane, and 1,2-epoxyicosane.

Examples of an epoxidized fatty acid monoester include an ester of an epoxidized C12 to C20 fatty acid with a C1 to C8 alcohol, or phenol or alkyl phenol. As an epoxidized fatty acid monoester, butyl-, hexyl-, benzyl-, cyclohexyl-, methoxyethyl-, octyl-, phenyl- and butylphenyl-esters of epoxystearic acid may be used preferably.

Examples of an epoxidized vegetable oil include an epoxy compound of a vegetable oil, such as a soybean oil, a linseed oil, and a cottonseed oil.

On a carbodiimide compound, and, for example, a dialkylcarbodiimide, diphenylcarbodiimide, and a bis(alkylphenyl)carbodiimide may be used. Examples of a dialkylcarbodiimide include diisopropylcarbodiimide, and dicyclohexylcarbodiimide. Examples of a bis(alkylphenyl)carbodiimide include ditolylcarbodiimide, bis(isopropylphenyl)carbodiimide, bis(diisopropylphenyl)carbodiimide, bis(triisopropylphenyl)carbodiimide, bis(butylphenyl)carbodiimide, bis(dibutylphenyl)carbodiimide, and bis(nonylphenyl)carbodiimide.

The refrigerating machine oil should preferably further contain an antioxidant among the above additives from the viewpoint of further improvement in stability. Examples of the antioxidant include phenolic antioxidants and amine antioxidants, and a phenolic antioxidant is preferably used.

Examples of the phenolic antioxidants include 4,4'-methylenebis(2,6-di-tert-butylphenol), 4,4'-bis(2,6-di-tert-butylphenol), 4,4'-bis(2-methyl-6-tert-butylphenol), 2,2'-methylenebis(4-ethyl-6-tert-butylphenol), 2,2'-methylenebis(4-methyl-6-tert-butylphenol), 4,4'-butylidenebis(3-methyl-6-tert-butylphenol), 4,4'-isopropylidenebis(2,6-di-tert-butylphenol), 2,2'-methylenebis(4-methyl-6-nonylphenol), 2,2'-isobutylidenebis(4,6-dimethylphenol), 2,2'-methylenebis(4-methyl-6-cyclohexylphenol), 2,6-di-tert-butyl-p-cresol, 2,6-di-tert-butyl-4-ethylphenol, 2,4-dimethyl-6-tert-butylphenol, 2,6-di-tert-α-dimethylamino-p-cresol, 2,6-di-tert-butyl-4(N,N'-dimethylaminomethylphenol), 4,4'-thiobis (2-methyl-6-tert-butylphenol), 4,4'-thiobis(3-methyl-6-tert-butylphenol), 2,2'-thiobis(4-methyl-6-tert-butylphenol), bis(3-methyl-4-hydroxy-5-tert-butylbenzyl)sulfide, bis(3,5-di-tert-butyl-4-hydroxybenzyl)sulfide, 2,2'-thio-diethylenebis[3-(3,5-di-tert-butyl-4-hydroxyphenyl)propionate], tridecyl-3-(3,5-di-tert-butyl-4-hydroxyphenyl)propionate, pentaerythrityl-tetarakis[3-(3,5-di-tert-butyl-4-hydroxyphenyl)propionate], octyl-3-(3,5-di-tert-butyl-4-hydroxyphenyl)propionate, octadecyl-3-(3,5-di-tert-butyl-4-hydroxyphenyl)propionate, and 3-methyl-5-tert-butyl-4-hydroxyphenyl-substituted fatty acid esters. These may be used singly or as a mixture of two or more. A preferred phenolic antioxidant is 2,6-di-tert-butyl-p-cresol from the viewpoint of improvement in stability.

The content of a base oil in a refrigerating machine oil is preferably 80% by mass or more based on the total amount of a refrigerating machine oil, more preferably 90% by mass or more, and further preferably 95% by mass or more in order to be superior in characteristics required for a refrigerating machine oil, such as lubricity, compatibility, thermal and chemical stability, and electrical insulation.

The kinematic viscosity of a refrigerating machine oil at 40° C. may be preferably 3 mm$^2$/s or more, more preferably 4 mm$^2$/s or more, and further preferably 5 mm$^2$/s or more; and may be preferably 1000 mm$^2$/s or less, more preferably 500 mm$^2$/s or less, and further preferably 400 mm$^2$/s or less. In another aspect, the kinematic viscosity of the refrigerating machine oil at 40° C. may be 80 mm$^2$/s or more, 100 mm$^2$/s or more, 140 mm$^2$/s or more, or 200 mm$^2$/s or more, may be 500 mm$^2$/s or less or 400 mm$^2$/s or less, and may be from 80 to 500 mm$^2$/s, from 100 to 500 mm$^2$/s or less, from 140 to 500 mm$^2$/s or less, or from 200 to 400 mm$^2$/s or less. The kinematic viscosity of a refrigerating machine oil at 100° C. may be preferably 1 mm$^2$/s or more, and more preferably 2 mm$^2$/s or more; and may be preferably 100 mm$^2$/s or less, and more preferably 50 mm$^2$/s or less.

Although there is no particular restriction on the volume resistivity of a refrigerating machine oil, it may be preferably $1.0 \times 10^9$ Ω·m or more, more preferably $1.0 \times 10^{10}$ Ω·m or more, and further preferably $1.0 \times 10^{11}$ Ω·m or more. Especially, when a refrigerating machine oil is used in a closed refrigerating machine, a high electrical insulation tends to be required. The volume resistivity as used herein means a volume resistivity measured at 25° C. according to JIS C2101 "Testing methods of electrical insulating oils".

Although there is no particular restriction on the moisture content of a refrigerating machine oil, it may be preferably 200 ppm or less based on the total amount of a refrigerating machine oil, more preferably 100 ppm or less, and further preferably 50 ppm or less. Especially, when a refrigerating machine oil is used in a closed refrigerating machine, a low moisture content is required from the viewpoints of the thermal and chemical stability of a refrigerating machine oil, or influence on electrical insulation.

Although there is no particular restriction on the acid value of the refrigerating machine oil, the acid value may be preferably 0.1 mg KOH/g or less and more preferably 0.05 mg KOH/g or less in order to prevent corrosion of a metal used in the refrigerating machine or pipes and prevent degradation of an ester contained in the refrigerating machine oil according to the present embodiment. The acid value as used herein means an acid value measured according to JIS K2501 "Petroleum products and lubricants-Determination of neutralization number".

Although there is no particular restriction on the ash content in a refrigerating machine oil, it may be preferably 100 ppm or less, and more preferably 50 ppm or less for the sake of enhancement of thermal and chemical stability, and suppression of generation of sludge, etc. The ash content as used herein means an ash measured according to JIS K 2272 "Crude oil and petroleum products-Determination of ash and sulfated ash".

The pour point of a refrigerating machine oil may be preferably −10° C. or less, more preferably −20° C. or less, and further preferably −30° C. or less. The pour point as used herein means a pour point measured according to JIS K2269.

The refrigerating machine oil according to the present embodiment is used in combination with a (Z)-1,1,1,4,4,4-hexafluoro-2-butene (HFO-1336mzz) refrigerant. The working fluid composition for a refrigerating machine according to the present embodiment contains a (Z)-1,1,1,4,4,4-hexafluoro-2-butene (HFO-1336mzz) refrigerant.

Namely, a composition containing at least one oxygen-containing oil with the carbon/oxygen molar ratio of 2.5 or more and 5.8 or less is favorably utilized as a constituent of a refrigerating machine oil to be used together with a (Z)-1,1,1,4,4,4-hexafluoro-2-butene refrigerant, or as a constituent of a working fluid composition for a refrigerating machine containing a refrigerating machine oil and a (Z)-1,1,1,4,4,4-hexafluoro-2-butene refrigerant.

A composition containing at least one oxygen-containing oil with the carbon/oxygen molar ratio of 2.5 or more and 5.8 or less is favorably utilized for producing a refrigerating machine oil to be used together with a (Z)-1,1,1,4,4,4-hexafluoro-2-butene refrigerant, or for producing a working fluid composition for a refrigerating machine containing a refrigerating machine oil and a (Z)-1,1,1,4,4,4-hexafluoro-2-butene refrigerant.

A refrigerant to be used with a refrigerating machine oil according to the present embodiment, and a refrigerant that a working fluid composition for a refrigerating machine according to the present embodiment contains, may further contain a publicly known refrigerant, such as a saturated fluorohydrocarbon refrigerant, and an unsaturated fluorohydrocarbon refrigerant, in addition to (Z)-1,1,1,4,4,4-hexafluoro-2-butene (HFO-1336mzz). The content of (Z)-1,1,1,4,4,4-hexafluoro-2-butene (HFO-1336mzz) is preferably 90% by mass or less based on the total amount of a refrigerant, more preferably 60% by mass or less, further preferably 50% by mass or less, especially preferably 40% by mass or less, and most preferably 20% by mass or less from the viewpoint of the stability of a refrigerating machine oil in an atmosphere of a refrigerant. The content of (Z)-1,1,1,4,4,4-hexafluoro-2-butene (HFO-1336mzz) is preferably 20% by mass or more based on the total amount of a refrigerant, more preferably 40% by mass or more, further preferably 50% by mass or more, especially preferably 60% by mass or more, and most preferably 90% by mass or more from the viewpoint of reduction of GWP.

Examples of a saturated fluorohydrocarbon refrigerant include any one or a mixture of two or more selected from the group consisting of difluoromethane (HFC-32), pentafluoroethane (HFC-125), 1,1,2,2-tetrafluoroethane (HFC-134), 1,1,1,2-tetrafluoroethane (HFC-134a), 1,1-difluoroethane (HFC-152a), fluoroethane (HFC-161), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,3,3,3-pentafluoropropane (HFC-245fa), and 1,1,1,3,3-pentafluorobutane (HFC-365mfc). Among them difluoromethane (HFC-32), and 1,1,1,2-tetrafluoroethane (HFC-134a) are preferable from the viewpoints of the stability of a refrigerating machine oil in an atmosphere of a refrigerant and reduction of GWP.

Examples of an unsaturated fluorohydrocarbon refrigerant include any one or a mixture of two or more selected from the group consisting of 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye), and 3,3,3-trifluoropropene (HFO-1243zf). Among them 2,3,3,3-tetrafluoropropene (HFO-1234yf) is preferable from the viewpoints of the stability of a refrigerating machine oil in an atmosphere of a refrigerant and reduction of GWP.

On the content of a refrigerating machine oil in a working fluid composition for a refrigerating machine, it may be preferably 1 part by mass or more based on 100 parts by mass of a refrigerant, and more preferably 2 parts by mass or more; and may be preferably 500 parts by mass or less, and more preferably 400 parts by mass or less.

A working fluid composition for a refrigerating machine according to the present embodiment is used advantageously in a room air-conditioner, a refrigerator, or an open- or closed type car air-conditioner provided with a reciprocal or rotary closed type compressor. A working fluid composition for a refrigerating machine, and a refrigerating machine oil according to the present embodiment are used advantageously in a cooling device, etc. such as a dehumidifier, a water heater, a freezer, a refrigerator/freezer storehouse, an automatic vending machine, a showcase, and a chemical plant. A working fluid composition for a refrigerating machine, and a refrigerating machine oil according to the present embodiment are also used advantageously in a device provided with a centrifugal compressor.

Examples

The present invention will be described below more specifically by way of Examples, provided that the present invention be not limited to the following Examples.

As base oils 1 to 8 polyesters between a fatty acid and a polyhydric alcohol with a composition set forth in Table 1 or 2 were prepared. In this regard, abbreviations in the tables stand for the following compounds.

iC4: 2-methylpropanoic acid
nC5: n-pentanoic acid
iC8: 2-ethylhexanoic acid
iC9: 3,5,5-trimethylhexanoic acid
nC10: n-decanoic acid
nC22: docosanoic acid
PET: pentaerythritol
DiPET: dipentaerythritol

TABLE 1

|  |  | Base oil 1 | Base oil 2 | Base oil 3 | Base oil 4 |
|---|---|---|---|---|---|
| Fatty acid composition (% by mole) | iC4 | — | 35 | — | — |
|  | nC5 | — | — | 40 | — |
|  | iC8 | 50 | — | — | — |
|  | iC9 | 50 | 65 | 60 | — |
|  | nC10 | — | — | — | 100 |
|  | nC22 | — | — | — | — |
| Polyhydric alcohol |  | PET | PET | PET | PET |
| Carbon/oxygen molar ratio |  | 4.9 | 4.3 | 4.3 | 5.6 |
| Kinematic viscosity (40° C., mm²/s) |  | 68 | 68 | 51 | — |

TABLE 2

|  |  | Base oil 5 | Base oil 6 | Base oil 7 | Base oil 8 |
|---|---|---|---|---|---|
| Fatty acid composition (% by mole) | iC4 | — | 40 | — | — |
|  | nC5 | 80 | — | — | — |
|  | iC8 | — | — | — | 50 |
|  | iC9 | 20 | — | — | 50 |
|  | nC10 | — | — | — | — |
|  | nC22 | — | 60 | 100 | — |
| Polyhydric alcohol |  | PET | PET | PET | DiPET |
| Carbon/oxygen molar ratio |  | 3.5 | 8.0 | 11.6 | 4.7 |
| Kinematic viscosity (40° C., mm²/s) |  | 22 | — | — | 220 |

In addition, the following base oils were used as base oils 9 to 11.

Base oil 9: Complex ester (Ester of adipic acid with butanediol, neopentyl glycol, and isononanol: Carbon/oxygen molar ratio=4.3, Kinematic viscosity at 40° C.=150 mm²/s)

Base oil 10: Polyalkylene glycol (Terminally-methyl-etherified polypropylene glycol: Weight average molecular weight=1100, Carbon/oxygen molar ratio=2.9, Kinematic viscosity at 40° C.=46.5 mm²/s)

Base oil 11: Polyvinyl ether (Copolymer of ethyl vinyl ether and isobutyl vinyl ether: Ethyl vinyl ether/isobutyl vinyl ether=7/1 (molar ratio), Weight average molecular weight=910, Carbon/oxygen molar ratio=4.3, Kinematic viscosity at 40° C.=66.4 mm²/s)

Sample oils (refrigerating machine oils) with compositions (% by mass based on the total amount of each sample oil (refrigerating machine oil)) shown in Tables 3 to 5 were prepared using the above base oils and the following additives.

Additive 1: glycidyl neodecanoate
Additive 2: 2-ethylhexyl glycidyl ether
Additive 3: tricresyl phosphate
Additive 4: 2,6-di-tert-butyl-p-cresol The following stability test was conducted on each sample oil. The results are shown in Tables 3 to 5.

(Stability Test)

A stability test was conducted according to JIS K2211-09 (Autoclave test). Specifically, 80 g of a sample oil conditioned to a moisture content of 100 ppm was weighed out and placed in an autoclave, to which a catalyst (iron wire, copper wire, and aluminum wire, each having an outer diameter of 1.6 mm, and a length of 50 mm), and 20 g of a (Z)-1,1,1,4,4,4-hexafluoro-2-butene (HFO-1336mzz) refrigerant were placed and after closing the autoclave was heated to 140° C. After 150 hours the acid value (JIS C2101) of the sample oil was measured.

TABLE 3

|  |  | Sample oils | | | | | | | |
|---|---|---|---|---|---|---|---|---|---|
|  |  | 1 | 2 | 3 | 4 | 5 | 6 | 7 | 8 |
| Composition (% by mass) | Base oil 1 | 100 | — | — | — | — | — | — | — |
|  | Base oil 2 | — | 100 | — | — | — | — | — | — |
|  | Base oil 3 | — | — | 100 | — | — | — | — | — |
|  | Base oil 4 | — | — | — | 100 | — | — | — | — |
|  | Base oil 5 | — | — | — | — | 100 | — | — | — |
|  | Base oil 6 | — | — | — | — | — | 100 | — | — |
|  | Base oil 7 | — | — | — | — | — | — | 100 | — |
|  | Base oil 8 | — | — | — | — | — | — | — | 100 |
| Stability Acid value (mgKOH/g) |  | 0.23 | 0.35 | 0.51 | 0.88 | 0.77 | 1.55 | 1.21 | 0.25 |

TABLE 4

|  |  | Sample oils | | | | | | |
|---|---|---|---|---|---|---|---|---|
|  |  | 9 | 10 | 11 | 12 | 13 | 14 | 15 |
| Composition (% by mass) | Base oil 1 | — | — | — | 99.5 | — | — | — |
|  | Base oil 2 | — | — | — | — | 99.5 | — | — |
|  | Base oil 3 | — | — | — | — | — | 99.4 | — |
|  | Base oil 4 | — | — | — | — | — | — | 99.5 |
|  | Base oil 9 | 100 | — | — | — | — | — | — |
|  | Base oil 10 | — | 100 | — | — | — | — | — |
|  | Base oil 11 | — | — | 100 | — | — | — | — |
|  | Additive 1 | — | — | — | 0.1 | 0.1 | 0.5 | 0.1 |
|  | Additive 2 | — | — | — | 0.1 | 0.1 | — | 0.1 |
|  | Additive 3 | — | — | — | 0.1 | 0.1 | — | 0.1 |
|  | Additive 4 | — | — | — | 0.2 | 0.2 | 0.1 | 0.2 |
| Stability Acid value (mgKOH/g) |  | 0.41 | 0.4 | 0.42 | <0.05 | <0.05 | <0.05 | <0.05 |

TABLE 5

| | | Sample oils | | | | | | |
|---|---|---|---|---|---|---|---|---|
| | | 16 | 17 | 18 | 19 | 20 | 21 | 22 |
| Composition (% by mass) | Base oil 5 | 99.4 | — | — | — | — | — | — |
| | Base oil 6 | — | 99.5 | — | — | — | — | — |
| | Base oil 7 | — | — | 99.5 | — | — | — | — |
| | Base oil 8 | — | — | — | 99.5 | — | — | — |
| | Base oil 9 | — | — | — | — | 99.5 | — | — |
| | Base oil 10 | — | — | — | — | — | 99.5 | — |
| | Base oil 11 | — | — | — | — | — | — | 99.5 |
| | Additive 1 | 0.5 | 0.1 | 0.1 | 0.1 | 0.1 | 0.1 | 0.1 |
| | Additive 2 | — | 0.1 | 0.1 | 0.1 | 0.1 | 0.1 | 0.1 |
| | Additive 3 | — | 0.1 | 0.1 | 0.1 | 0.1 | 0.1 | 0.1 |
| | Additive 4 | 0.1 | 0.2 | 0.2 | 0.2 | 0.2 | 0.2 | 0.2 |
| Stability Acid value (mgKOH/g) | | <0.05 | 0.55 | 0.62 | <0.05 | <0.05 | <0.05 | <0.05 |

The following refrigerant compatibility test was conducted on the sample oils 1 to 5 and 8 to 11 to have confirmed that all the sample oils were compatible with the refrigerant.

(Refrigerant Compatibility Test)

According to "Test method for compatibility with refrigerant" in JIS-K2211 "Refrigerating machine oils", 10 g of a sample oil was blended with 10 g of a (Z)-1,1,1,4,4,4-hexafluoro-2-butene (HFO-1336mzz) refrigerant, and the blend was observed to find whether the refrigerant and the refrigerating machine oil were mutually dissolved at 0° C.

The invention claimed is:

1. A working fluid composition for a refrigerating machine comprising:
   a refrigerating machine oil comprising, as a base oil, at least one oxygen-containing oil having a carbon/oxygen molar ratio of 2.5 or more and 5.8 or less; and
   a refrigerant comprising (Z)-1,1,1,4,4,4-hexafluoro-2-butene, wherein a content of (Z)-1,1,1,4,4,4-hexafluoro-2-butene is 20% by mass or more based on the total amount of the refrigerant.

2. The working fluid composition for a refrigerating machine according to claim 1, wherein the refrigerating machine oil comprises, as the at least one oxygen-containing oil, an ester of a polyhydric alcohol and a fatty acid wherein a ratio of C4 to C20 fatty acids in the fatty acid is from 20 to 100% by mole, and wherein the ester has a carbon/oxygen molar ratio of 4.0 or more and 5.0 or less.

3. The working fluid composition for a refrigerating machine according to claim 1, wherein the refrigerating machine oil comprises, as the at least one oxygen-containing oil, an ester of a polyhydric alcohol and a fatty acid wherein a ratio of C4 to C20 branched fatty acids in the fatty acid is from 50 to 100% by mole, and wherein the ester has a carbon/oxygen molar ratio of 4.0 or more and 5.0 or less.

4. The working fluid composition for a refrigerating machine according to claim 1, wherein a content of (Z)-1,1,1,4,4,4-hexafluoro-2-butene is 60% by mass or more based on the total amount of the refrigerant.

5. The working fluid composition for a refrigerating machine according to claim 1, wherein the refrigerating machine oil further comprises an additive selected from the group consisting of an acid scavenger, an antifoaming agent, a metal deactivator, a viscosity index improver, a pour-point depressant, a detergent dispersant, tricresyl phosphate, an amine antioxidants, and a phenolic antioxidant, and wherein the phenolic antioxidant is selected from the group consisting of 4,4'-methylenebis(2,6-di-tert-butylphenol), 4,4'-bis(2,6-di-tert-butylphenol), 4,4'-bis(2-methyl-6-tert-butylphenol), 2,2'-methylenebis(4-ethyl-6-tert-butylphenol), 2,2'-methylenebis(4-methyl-6-tert-butylphenol), 4,4'-butylidenebis(3-methyl-6-tert-butylphenol), 4,4'-isopropylidenebis(2,6-di-tert-butylphenol), 2,2'-methylenebis(4-methyl-6-nonylphenol), 2,2'-isobutylidenebis(4,6-dimethylphenol), 2,2'-methylenebis(4-methyl-6-cyclohexylphenol), 2,6-di-tert-butyl-p-cresol, 2,6-di-tert-butyl-4-ethylphenol, 2,4-dimethyl-6-tert-butylphenol, 2,6-di-tert-a-dimethylamino-p-cresol, 2,6-di-tert-butyl-4(N,N'-dimethylaminomethylphenol), 4,4'-thiobis(2-methyl-6-tert-butylphenol), 4,4'-thiobis(3-methyl-6-tert-butylphenol), 2,2'-thiobis(4-methyl-6-tert-butylphenol), 2,2'-thio-diethylenebis[3-(3,5-di-tert-butyl-4-hydroxyphenyl)propionate], tridecyl-3-(3,5-di-tert-butyl-4-hydroxyphenyl)propionate, pentaerythrityl-tetarakis[3-(3,5-di-tert-butyl-4-hydroxyphenyl)propionate], octyl-3-(3,5-di-tert-butyl-4-hydroxyphenyl)propionate, octadecyl-3-(3,5-di-tert-butyl-4-hydroxyphenyl)propionate, and 3-methyl-5-tert-butyl-4-hydroxyphenyl-substituted fatty acid esters.

6. The working fluid composition for a refrigerating machine according to claim 5, wherein the refrigerating machine oil comprises, as the at least one oxygen-containing oil, an ester of a polyhydric alcohol and a fatty acid wherein a ratio of C4 to C20 fatty acids in the fatty acid is from 20 to 100% by mole, and wherein the ester has a carbon/oxygen molar ratio of 4.0 or more and 5.0 or less.

7. The working fluid composition for a refrigerating machine according to claim 5, wherein the refrigerating machine oil comprises, as the at least one oxygen-containing oil, an ester of a polyhydric alcohol and a fatty acid wherein a ratio of C4 to C20 branched fatty acids in the fatty acid is from 50 to 100% by mole, and wherein the ester has a carbon/oxygen molar ratio of 4.0 or more and 5.0 or less.

8. The working fluid composition for a refrigerating machine according to claim 7, wherein the additive comprises the acid scavenger and the phenolic antioxidant.

9. The working fluid composition for a refrigerating machine according to claim 5, wherein the additive comprises the acid scavenger and the phenolic antioxidant.

* * * * *